United States Patent
Tao et al.

(10) Patent No.: US 7,408,789 B2
(45) Date of Patent: Aug. 5, 2008

(54) MOUNTING DEVICE FOR EXPANSION CARD

(75) Inventors: Lang Tao, Shenzhen (CN); Chieh Yang, Tu-Cheng (TW); Li-Ping Chen, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 43 days.

(21) Appl. No.: 11/309,209

(22) Filed: Jul. 13, 2006

(65) Prior Publication Data

US 2008/0013297 A1    Jan. 17, 2008

(51) Int. Cl.
*H05K 7/18* (2006.01)

(52) U.S. Cl. .................. 361/801; 361/726; 361/732; 361/740; 361/747; 361/796; 439/152; 439/153; 439/160; 439/377

(58) Field of Classification Search .................. 361/726, 361/732, 740, 747, 759, 796, 801
See application file for complete search history.

(56) References Cited

U.S. PATENT DOCUMENTS

| | | | |
|---|---|---|---|
| 5,914,854 A * | 6/1999 | Holt | 361/683 |
| 6,069,796 A | 5/2000 | Hastings et al. | |
| 6,169,662 B1 * | 1/2001 | Clark et al. | 361/754 |
| 6,231,139 B1 | 5/2001 | Chen | |
| 6,357,603 B1 | 3/2002 | Dingman | |
| 6,381,149 B1 * | 4/2002 | Megason et al. | 361/801 |
| 6,552,913 B2 | 4/2003 | Tournadre | |
| 7,002,811 B2 * | 2/2006 | Jing et al. | 361/801 |

* cited by examiner

*Primary Examiner*—Dean A. Reichard
*Assistant Examiner*—Hoa C Nguyen
(74) *Attorney, Agent, or Firm*—Wei Te Chung

(57) ABSTRACT

A mounting device for a circuit card includes a motherboard adapted for receiving the circuit card inserted therein, a computer enclosure configured for accommodating the motherboard, a securing plate mounted on the computer enclosure, and a retaining member with a receiving slot. The retaining member slides along the securing plate and in parallel with one end edge of the circuit card to have the end edge of the circuit card received in the receiving slot. A locking structure is formed between the retaining member and the securing plate for locking the retaining member to the securing plate.

15 Claims, 4 Drawing Sheets

MOUNTING DEVICE FOR EXPANSION CARD

FIELD OF THE INVENTION

The present invention relates to mounting devices, and more particularly to a mounting device which readily and firmly secures an expansion card in a computer chassis.

DESCRIPTION OF RELATED ART

Nowadays, most computer systems or other electronic devices employ a plurality of circuit cards, such as expansion cards, adapters, and PC (person computer) boards. These cards or boards are typically mounted to a computer motherboard in a perpendicular fashion relative to the computer motherboard. In particular, the cards are usually inserted into edge card connectors, which are mounted on the computer motherboard. However, merely inserting a card into an edge card connector is typically insufficient to securely maintain the card within the computer chassis. A card connected in this fashion could easily disconnect from the edge card connector, which may prevent, or significantly inhibit, acceptable operation of the computer. Accordingly, additional structure is normally required to secure a card within a computer chassis. A conventional manner of securing a card within a computer chassis is to provide a card bracket fastened to the computer chassis with a removable screw. However, a significant disadvantage of a screw-secured bracket is that the screw is often inadvertently dropped into the computer chassis during installation and removal of the bracket.

Another typical mounting assembly for securing expansion cards includes a rear panel and a fixing cover attached to the rear panel. The rear panel defines a plurality of expansion slots for receiving expansion cards. A fixing plate is stamped from the rear panel adjacent to an end of the expansion slots and forms a plurality of protrusions. Each expansion card includes a slot cover forming a bent portion for abutting against the fixing plate. Each bent portion defines a cutout for engaging with the protrusion of the fixing plate thereby positioning the expansion cards. The fixing cover forms a plurality of elastic tabs for pressing the bent portion of the slot cover thereby fixing the expansion cards. A pair of through holes is defined in the fixing cover and a pair of screw holes is correspondingly defined in the rear panel. A pair of screws extends through the through holes and threadedly engages in the screw holes thereby fixing the fixing cover to the rear panel. However, the above-described operation of the mounting assembly for securing expansion cards is comparatively complicated. Furthermore, the fixing cover has to be released from the rear panel when a new expansion card needs to be inserted into the chassis or some mounted expansion cards need to be taken out of the chassis due to repair or maintenance. Thus, it is possible to cause other expansion cards to come loose, thereby influencing the stability of the computer system in operation.

What is needed, therefore, is a mounting device which readily and firmly secures an expansion card to a computer chassis.

SUMMARY OF THE INVENTION

A mounting device for a circuit card includes a motherboard adapted for receiving the circuit card inserted therein, a computer enclosure configured for accommodating the motherboard, a securing plate mounted on the computer enclosure, and a retaining member with a receiving slot. The retaining member slides along the securing plate and in parallel with one end edge of the circuit card to have the end edge of the circuit card received in the receiving slot. A locking structure is formed between the retaining member and the securing plate for locking the retaining member to the securing plate.

Other advantages and novel features will become more apparent from the following detailed description of preferred embodiments when taken in conjunction with the accompanying drawings, in which:

DETAILED DESCRIPTION OF THE INVENTION

Figure 1:
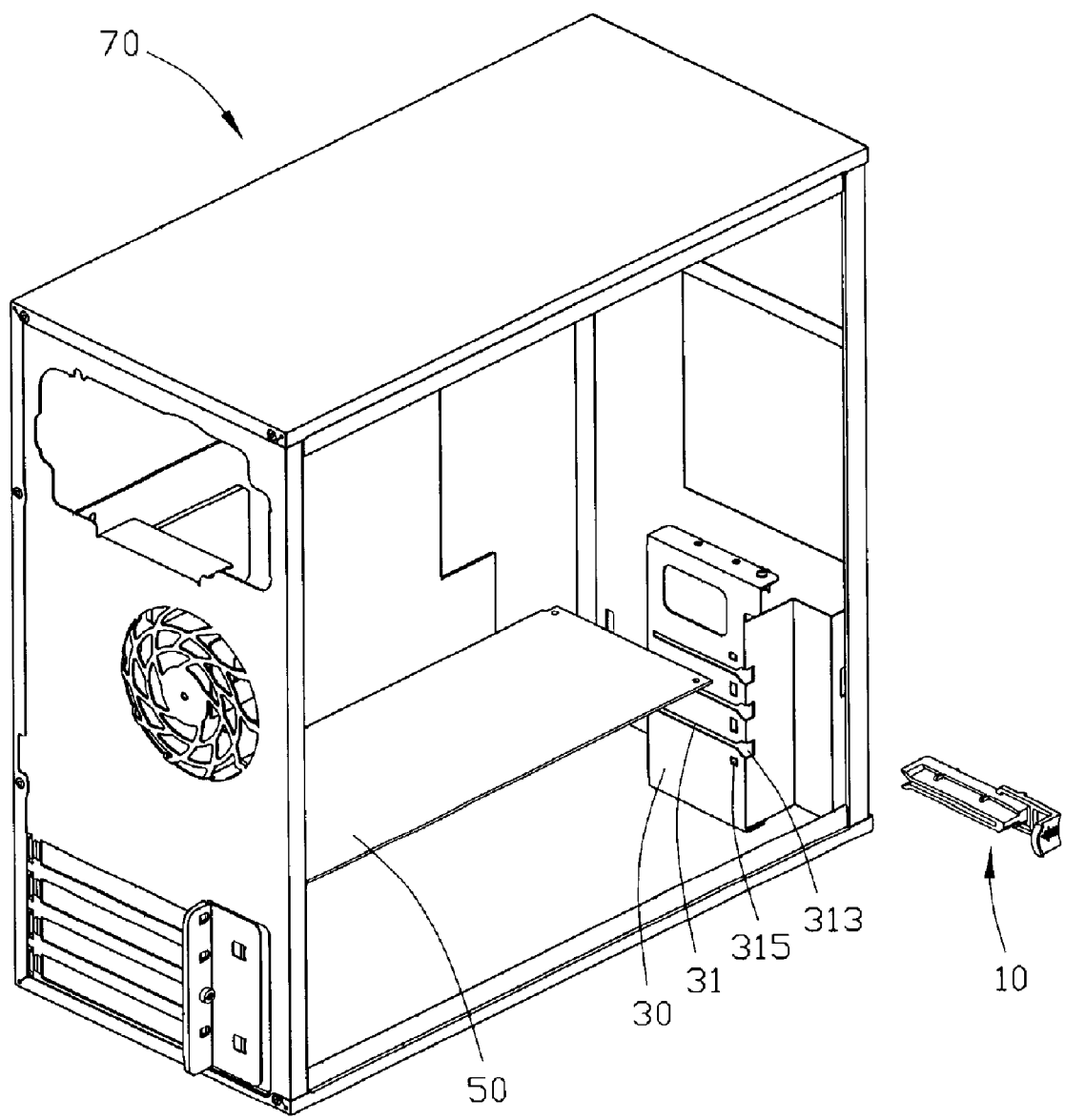
FIG. 1 is an exploded isometric view of a mounting device for an expansion card of a preferred embodiment of the present invention, including a retaining member, and a securing plate fixed on a computer enclosure.

Referring to FIG. 1, a mounting device for an expansion card includes a retaining member 10, and a securing plate 30. An expansion card 50 is removably locked in a computer enclosure 70 via the retaining member 10 and the securing plate 30.

The securing plate 30 is fixed on an inner surface of a front panel of the computer enclosure 70. A plurality of parallel positioning slots 31 is defined on the securing plate 30. An enlarged opening 313 is defined in the securing plate 30 at an end of each positioning slot 31 respectively, and the positioning slot 31 is narrower than the opening 313. A pair of rectangular positioning apertures 315 is defined in the securing plate 30 above and below sides of each opening 313 respectively.

Figure 2:
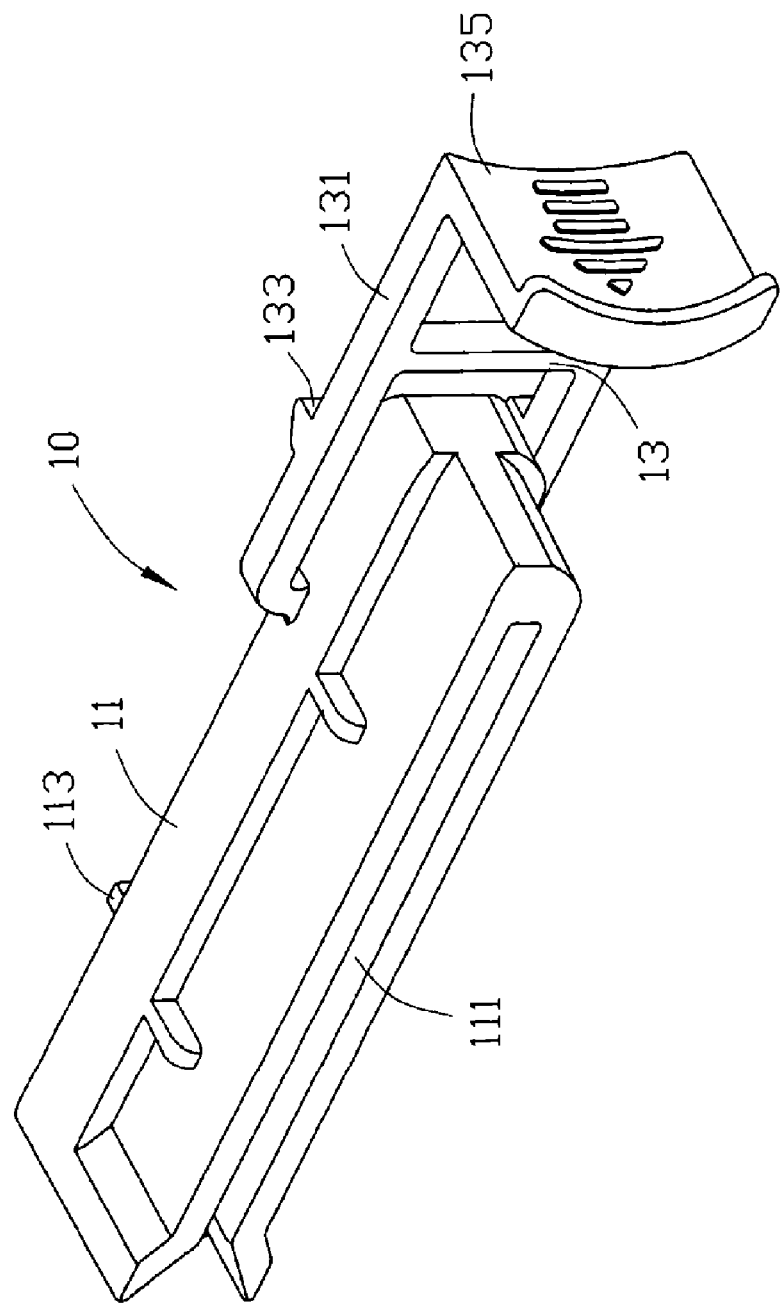
FIG. 2 is an isometric view of the retaining member of the mounting device.
Figure 3:
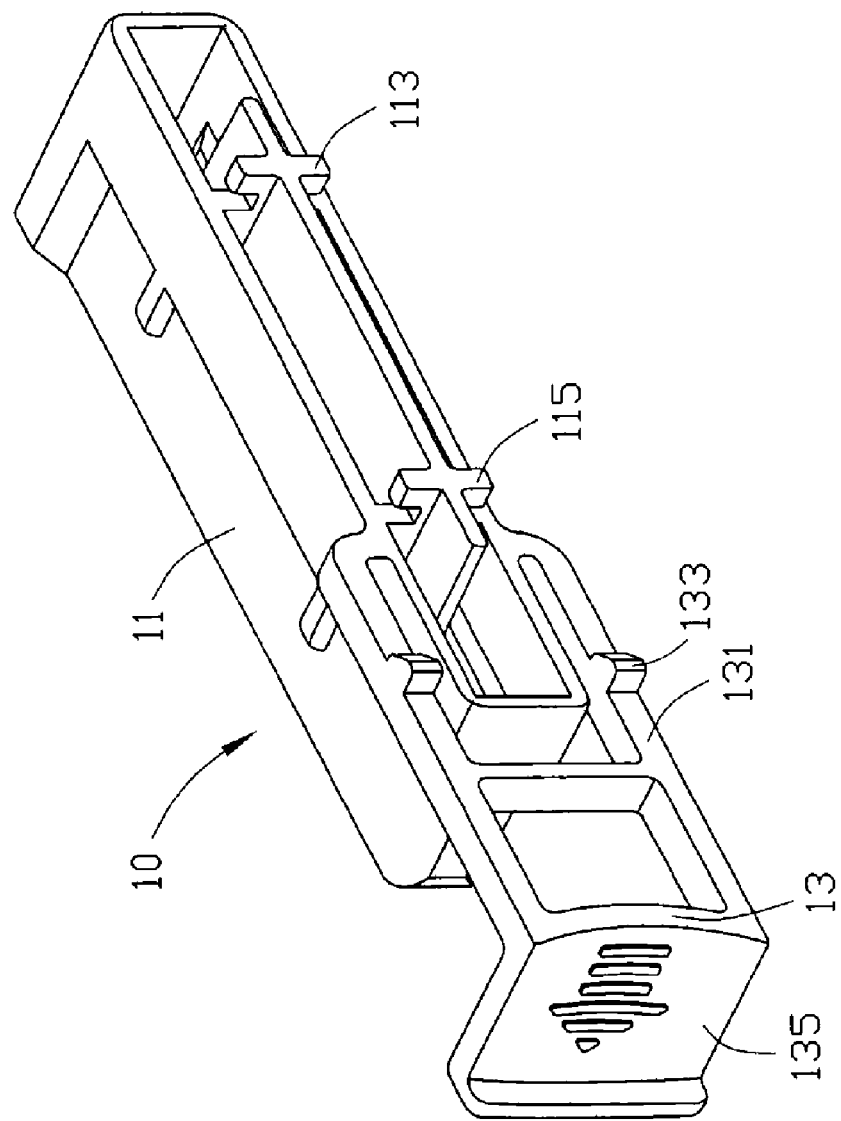
FIG. 3 is another isometric view of the retaining member of the mounting device.

Referring to FIGS. 2 and 3, the retaining member 10 includes a body 11 and an operating portion 13, and the operating portion 13 is formed on a distal end of the body 11. An elongated receiving slot 111 is defined along one side of the body 11, and a cross-shaped first positioning block 113 and a cross-shaped second positioning block 115 are formed on an opposite side of the body 11. One end of the receiving slot 111 adjacent to the operating portion 13 is close and the other end away from the operating portion 13 is open. The first positioning block 113 is adjacent to an end of the body 11, and the second positioning block 115 is adjacent to a joint of the body 11 and the operating portion 13. The operating portion 13 comprises a pair of resilient arms 131 connected with the body 11 at opposite sides of the receiving slot 111, and a pressing tab 135 formed at and connected between distal ends of the pair of arms 131. A pair of wedge-shaped protrusions 133 extends out from the arms 131. A locking structure is configured by the protrusions 133 and the corresponding positioning apertures 315 of the securing plate 30.

Figure 4:
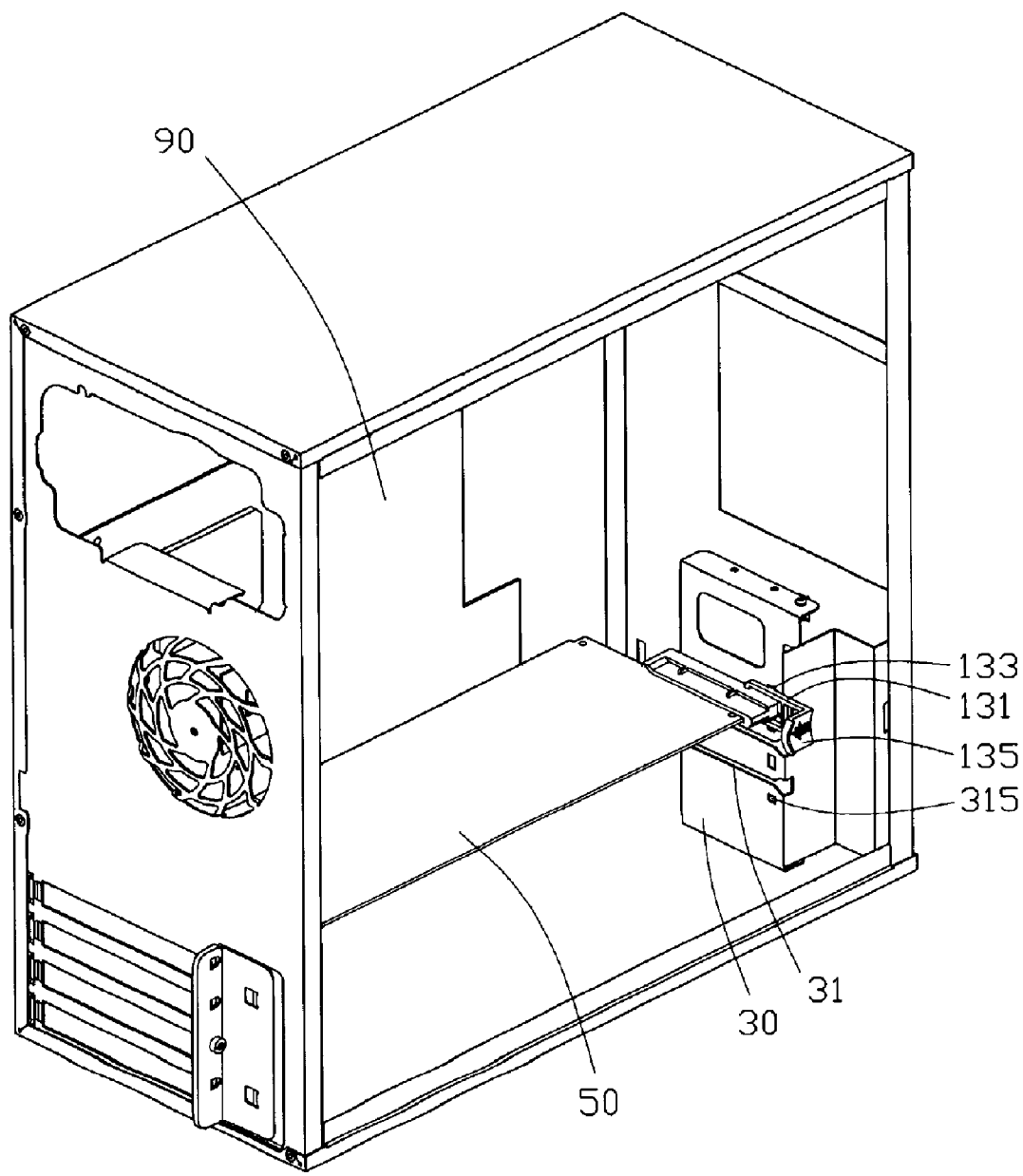
FIG. 4 is an assembled isometric view of FIG. 1.

Referring also to FIG. 4, in assembly, the expansion card 50 is first mounted to a motherboard 90. Then the first positioning block 113 of the retaining member 10 is aligned with and inserted into the opening 313 of the securing plate 30. The pressing tab 135 of the retaining member 10 is pushed to urge the first positioning block 113 to further slide along the positioning slot 31 of the securing plate 30. Meanwhile, a side edge of the expansion card 50 engages in the receiving slot 111 of the retaining member 10. The retaining member 10 is pushed continuously, and the second positioning block 115 passes by the opening 313 and then slides into the positioning slot 31 of the securing plate 30. Both of the first positioning block 113 and the second positioning block 115 resist against edges of the positioning slot 31 of the securing plate 30. Consequently, the retaining member 10 is limited to move in a direction perpendicular to the securing plate 30. When the retaining member 10 is further pushed, the protrusions 133 of the retaining member 10 are squeezed by the securing plate 30. At that moment, the arms 131 of the retaining member 10 are in a deformed state. When the retaining member 10 is entirely inserted into the securing plate 30, the protrusions 133 engage in the corresponding positioning apertures 315 of the securing plate 30, and the arms 131 of the retaining member 10 rebound to their original position, and the side edge of the expansion card 50 is totally engaged in the receiving slot 111 of the retaining member 10. Another side edge of the expansion card 50 opposing the motherboard 90 abuts the close end of the receiving slot 111. Thus, the expansion card 50 is securely mounted to the motherboard 90. The other side edge of the expansion card 50 adjacent to the rear panel of the computer enclosure 70 is mounted in a conventional way.

In disassembly of the expansion card 50, the pressing tab 135 of the retaining member 10 is pulled in a direction perpendicular to and away from the securing plate 30, and the protrusions 133 of the retaining member 10 are released from the corresponding positioning apertures 315 of the securing plate 30. The retaining member 10 is drawn out of the securing plate 30 until the side edge of the expansion card 50 is totally disengaged from the receiving slot 111 of the retaining member 10. After the other side edge of the expansion card 50 is unlocked in a conventional way, the expansion card 50 is then released from the motherboard 90.

It is to be understood, however, that even though numerous characteristics and advantages have been set forth in the foregoing description of a preferred embodiments, together with details of the structure and function of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting device for a circuit card comprising:
a motherboard adapted for receiving the circuit card inserted therein;
a computer enclosure configured for accommodating the motherboard;
a securing plate mounted on the computer enclosure; and
a retaining member comprising a body having a U-shaped cross-section with a receiving slot formed between legs of the U-shaped cross-section body and an opening formed between distal ends of the legs of the U-shaped cross-section body, the retaining member being configured for receiving an end edge of the circuit card in the receiving slot and allowing the end edge thereof to extend through the opening of the body, a locking structure formed between the retaining member and the securing plate for locking the retaining member to the securing plate;
wherein the retaining member comprises a resilient operating portion extending from the body, the locking structure comprises a positioning aperture defined in the securing plate and a protrusion formed on the resilient operating portion of the retaining member engaging in the positioning aperture.

2. The mounting device as claimed in claim 1, wherein the resilient operating portion forms at least one resilient arm extending from the body, and the protrusion is formed on the at least one resilient arm.

3. The mounting device as claimed in claim 1, wherein the securing plate defines at least one positioning slot in parallel with the receiving slot, and at least one positioning block is formed on the retaining member and slidably received in the at least one positioning slot.

4. The mounting device as claimed in claim 3, wherein at least one enlarged opening is formed in the securing plate and communicated with the at least one positioning slot for allowing the at least one positioning block to enter the positioning slot.

5. The mounting device as claimed in claim 3, wherein the at least one positioning block is cross-shaped.

6. The mounting device as claimed in claim 1, wherein the receiving slot has a closed end resisting against another end edge of the circuit card which is opposite to the motherboard to press the circuit card towards the motherboard.

7. A mounting assembly comprising:
a circuit card;
a computer enclosure, comprising a securing plate apart from the circuit card; and
a retaining member slidably attached to the securing plate and located between the securing plate and an end edge of the circuit card, a first side of the retaining member, which faces to the end edge of the circuit card, defining a receiving slot parallel with the end edge to sandwich the end edge therein, and a locking structure formed on a second side of the retaining member opposite to the first side and the securing plate for detachably locking the retaining member in the computer enclosure;
wherein at least one positioning slot is defined in the securing plate in parallel with the receiving slot, and at least one positioning block is formed on the retaining member and slidably engaged in the at least one positioning slot, an opening is defined in an end of the at least one positioning slot for allowing the at least one positioning block to enter the positioning slot, and at least one positioning slot is narrower than the opening.

8. The mounting assembly as claimed in claim 7, wherein the retaining member comprises two parallel pieces parallel to the end edge of the circuit card, the receiving slot is defined between the two parallel pieces, the receiving slot has an open end through which the circuit card is inserted into the receiving slot to be clamped by the two parallel pieces.

9. The mounting assembly as claimed in claim 8, wherein the receiving slot has a closed end resisting against another end edge of the circuit card which is adjacent to the sandwiched end edge.

10. The mounting assembly as claimed in claim 7, wherein the locking structure comprises a positioning aperture defined in the securing plate and a protrusion formed on the retaining member engaging in the positioning aperture.

11. The mounting assembly as claimed in claim 10, wherein the retaining member comprises an operating portion, and the protrusion is formed on the operating portion.

12. The mounting assembly as claimed in claim 11, wherein the operating portion forms at least one resilient arm, and the protrusion is formed on the at least one resilient arm.

13. A combination comprising:
a computer enclosure comprising a front panel, a rear panel parallel to the front panel, and a side panel perpendicularly to the front and real panels and connecting the front and rear panels;
a motherboard lain on the side panel;

a circuit card perpendicularly attached to the motherboard, the circuit card comprising a front edge and a rear edge both parallel to the front and rear panels, and a top edge parallel to the motherboard, the rear edge of the circuit card secured to the rear panel of the computer enclosure;

a retaining member located between the front edge of the circuit card and the front panel of the computer enclosure, a first side of the retaining member, which faces to the front edge of the circuit card, defining a receiving slot parallel with the first edge of the circuit card, the receiving slot having an open end through which the circuit card is inserted into the receiving slot to be clamped by the retaining member, and a closed end resisting against the top edge of the circuit card towards the motherboard, a second side of the retaining member opposite to the first side being slidably mounted on the front panel of the computer enclosure.

14. The combination as claimed in claim 13, wherein the retaining member comprises two parallel pieces parallel to the front edge of the circuit card, the receiving slot is defined between the two parallel pieces.

15. The combination as claimed in claim 13, wherein a securing plate is secured on the front panel of the computer enclosure, at least one positioning slot is defined in the securing plate in parallel with the receiving slot, and at least one positioning block is formed on the retaining member and slidably engaged in the at least one positioning slot to slidably mount the retaining member to the front panel of the computer enclosure.

* * * * *